United States Patent
Stenzel

(10) Patent No.: US 10,965,057 B2
(45) Date of Patent: Mar. 30, 2021

(54) METHOD FOR CHECKING A SEALING OF A PLUG CONNECTION, AND PLUG CONNECTION

(71) Applicant: LEONI BORDNETZ-SYSTEME GMBH, Kitzingen (DE)

(72) Inventor: Alexander Stenzel, Bad Windsheim (DE)

(73) Assignee: LEONI Bordnetz-Systeme GmbH, Kitzingen (DE)

( * ) Notice: Subject to any disclaimer, the term of this patent is extended or adjusted under 35 U.S.C. 154(b) by 317 days.

(21) Appl. No.: 16/055,572

(22) Filed: Aug. 6, 2018

(65) Prior Publication Data
US 2019/0044275 A1 Feb. 7, 2019

(30) Foreign Application Priority Data
Aug. 4, 2017 (DE) ..................... 10 2017 213 592.1

(51) Int. Cl.
*G01M 3/28* (2006.01)
*H01R 13/52* (2006.01)

(52) U.S. Cl.
CPC ...... *H01R 13/5221* (2013.01); *G01M 3/2838* (2013.01); *H01R 13/5202* (2013.01); *H01R 13/5205* (2013.01); *H01R 13/5219* (2013.01)

(58) Field of Classification Search
CPC .. G01M 3/2838; G01M 3/04; H01R 13/5221; H01R 13/5219; H01R 13/5205; H01R 13/5202; H01R 13/502; H01R 13/6272; H01R 24/00; H01R 2201/20
See application file for complete search history.

(56) References Cited

U.S. PATENT DOCUMENTS

| 3,818,120 | A | | 6/1974 | Spinner | |
|---|---|---|---|---|---|
| 4,571,986 | A | * | 2/1986 | Fujii | G01M 3/2846 138/90 |
| 6,599,144 | B1 | | 7/2003 | Schumann et al. | |
| 9,515,404 | B2 | | 12/2016 | Hoefner et al. | |
| 9,994,747 | B2 | | 6/2018 | Ooki | |
| 2006/0240701 | A1 | * | 10/2006 | Schremmer | H01R 12/675 439/404 |
| 2014/0364001 | A1 | * | 12/2014 | Kraus | H01R 13/6275 439/358 |
| 2015/0263445 | A1 | * | 9/2015 | Hoefner | H01R 13/521 439/660 |

FOREIGN PATENT DOCUMENTS

| CN | 201690041 U | 12/2010 |
|---|---|---|
| CN | 203859356 U | 10/2014 |

(Continued)

*Primary Examiner* — Suman K Nath
(74) *Attorney, Agent, or Firm* — Laurence A. Greenberg; Werner H. Stemer; Ralph E. Locher

(57) ABSTRACT

A method checks a sealing of an interior space of a plug connection that is to be tested. The plug connection has two plug connection elements, namely a plug connector element and a mating connector element, the plug connector element being plugged into the mating connector element in a plug-in direction. One of the plug connection elements additionally has a test opening to the interior space, via which, for the purpose of checking the sealing, a test medium is applied to the interior space, and the test opening is then sealed toward the interior space.

13 Claims, 2 Drawing Sheets

(56) References Cited

FOREIGN PATENT DOCUMENTS

| | | |
|---|---|---|
| CN | 104813544 A | 7/2015 |
| DE | 4015793 A1 | 12/1990 |
| DE | 29823046 U1 | 6/1999 |
| DE | 102016100817 A1 | 7/2017 |
| DE | 112015004044 T5 | 7/2017 |
| JP | H06223917 A | 8/1994 |
| KR | 1019900004885 B1 | 7/1990 |
| KR | 1019980010473 A | 4/1998 |
| KR | 100771099 B1 | 10/2007 |
| WO | 2017125363 A1 | 7/2017 |

\* cited by examiner

METHOD FOR CHECKING A SEALING OF A PLUG CONNECTION, AND PLUG CONNECTION

CROSS-REFERENCE TO RELATED APPLICATION

This application claims the priority, under 35 U.S.C. § 119, of German application DE 10 2017 213 592.1, filed Aug. 4, 2017; the prior application is herewith incorporated by reference in its entirety.

BACKGROUND OF THE INVENTION

Field of the Invention

The invention relates to a method for checking a sealing of a plug connection, and to a plug connection.

Plug connections are used in virtually all supply networks. They are usually composed of a plug connector element and a mating connector element, which are plugged into each other and thus electrically connect, for example, at least two electric cables or one electric cable to a housing of an electric component.

Such plug connections frequently have to be sealed against environmental influences. Particularly in the automotive sector, and within that especially in so-called wet spaces such as, for example, in the engine compartment, tightness of seal is essential. This also applies, in particular, to electric supply cables, in particular high-voltage cables that are designed, for example, to supply electric current to electric drive components such as, for example, an electric drive motor.

In order to ensure tightness of seal, in some cases there is provision to check the tightness of the sealing of the plug connection. In this case, a test medium, for example compressed air, is applied to the plug connection, in that the test medium is passed, via the cables connected to the respective plug connector elements, into an interior space of the plug connection that is to be tested. However, this method is difficult to impossible to perform in the case of electric cables of less than a minimum cross section.

Proceeding from this, the invention is based on the object of specifying a method and a plug connection such that the sealing of the plug connection can be checked with ease.

SUMMARY OF THE INVENTION

The object is achieved according to the invention by a method for checking the sealing of a plug connection having the features of the main claim.

Advantageous designs, developments and variants are provided by the dependent claims.

The method described is configured to check a sealing of an interior space of a plug connection that is to be tested. A plug connection is to be understood generally to mean, in particular, a reversible, for example electrical, connection between two connector elements, namely a plug connector element and a mating connector element. In this case, at least one electric cable is connected to a further electric component via the plug connection. The further component is preferably a further cable. Arranged within the plug connector element are plug connector contacts, which correspond with mating connector contacts arranged in the mating connector element and which, in the connected state, produce an electrical connection.

Both the plug connector element and the mating connector element have a housing. To realize the plug connection, the housings are usually plugged into each other in a form-fitting manner, in a plug-in direction. When in the connected state, the contact elements of the two housings are located within an interior space of the plug connection. This interior space must be sealed outwardly, e.g. against moisture, and form an interior space to be checked for tightness of seal. This interior space to be tested is typically realized in each case by a part of the housing of the plug connector element and by a part of the housing of the mating connector element.

The electric cable to be terminated or connected is inserted in a sealed state into the housing of the plug connector element.

For the purpose of testing the sealing of the interior space, one of the plug connection elements has a test opening, for example in the manner of a cylindrical hole. A test medium is applied, through the test opening, to the interior space to be tested. It is then easily checked whether the test medium emerges from or at a location of the interior space to be tested, and in particular at a sealing between the housings of the plug connector elements or at the leadthroughs of the electric cables into the interior of the plug connector elements, and a leakage is thus identified. In particular, in order to test the sealing sufficiently, the test medium is applied under pressure.

Following the checking operation, the test opening is sealed toward the interior space in order to prevent, for example, moisture from entering the interior space through the test opening, and thus consequently to achieve complete sealing of the interior space. Following the testing operation, therefore, the interior space is sealed in a reliable manner.

Such checking enables a plug connection to be checked in a simple and reliable manner in respect of its sealing. In particular, the checking is non-dependent on a conductor cross section of the core cables that are connected by the plug connections.

It is of particular importance in this case that deliberately made in at least one housing part of the plug connection is a test opening via which the test medium can be introduced and that, at the same time, a precaution is taken so that, in normal operation, the test opening does not constitute a leakage location.

Preferably, for the purpose of sealing the test opening toward the interior space, a sealing element is moved into a sealing position, in the plug-in direction, beyond the test opening. The sealing position in this case is understood to mean specifically a position of the sealing element in which the sealing element is preferably arranged between the interior space to be tested and the test opening. A previously existing flow connection, between the test opening and the interior space, via which the test medium is preferably applied to the interior space, is thereby removed.

Preferably, the plug connection has a component part that is moved in the plug-in direction during the assembling of the plug connection, the sealing element in this case being moved automatically together with the component part. Movement of the sealing element into the sealing position, and thus sealing of the interior space, is thereby ensured. The component part in this case is realized in such a manner that, for example, either it has means by which the sealing element is moved, or the component part is realized in such a manner that the sealing element is arranged on the component part.

According to a first design variant, the plug connector element has the test opening. For the purpose of checking the interior space, the plug connector element is preferably first plugged into a test position, into the mating connector element. Following the checking, the plug connector element is brought into a final assembled position, into the mating connector element, in order to seal the test opening toward the interior space. Thus, in the test position, the plug connection is not yet finally realized. This position is therefore an intermediate position. The final assembled position is ultimately achieved by plugging the two plug connector elements further into one another. Preferably, therefore, only a further movement of the two plug connector elements into one another is needed in order to seal the test opening toward the interior space to be tested.

To realize the test position, the plug connector element is preferably plugged in the plug-in direction, for example by half of its length, into the mating connector element. Owing to the preferably form-fit design between the plug connector element and the mating connector element, the interior space to be checked is realized already in the test position.

The advantage of this design is that the checking of the sealing is effected, for example, as part of a process of fabricating the plug connection. Following a successful test, the desired plug connection is realized by plugging the plug connector element into the mating connector element. The checking and realization of the plug connection are thus effected virtually in one production step. There is no need for a separate, expensive production step for checking the sealing.

For the purpose of sealing the interior space along the form-fit of the plug connector housing, the sealing element is preferably arranged between the plug connector element and the mating connector element, such that the interior space is sealed by the sealing element. For this purpose, the part of the plug connection element, in which the test opening is made—as viewed in the plug-in direction—moves behind the sealing element when being moved into the end position. Thus, in the end position, the test opening is no longer "connected" to the interior space, thereby at the same time achieving complete sealing of the interior space. The component part by which the sealing element is moved is thus preferably one of the plug connection elements. In particular, the component part is the mating connector element, which, in the final assembled state, "encompasses" the plug connector element. Furthermore, in particular, the sealing element is arranged in a force-fitting manner, for example adhesively bonded, on the mating connector element.

Expediently, for the purpose of realizing the plug connection, the plug connector element is partially surrounded by the mating connector element in the test position, and preferably completely surrounded in the end position. The sealing element in this case is realized as a ring seal. The advantage of this design is to be seen in the simple and complete sealing of the interior space of the plug connection.

For the purpose of fixing the plug connection, according to one preferred design the plug connector element has a latching lug. In addition, the mating connector element has a latching recess that corresponds with the latching lug, such that, in the final assembled position, the latching lug latches in the latching recess.

A simple fixing of the plug connection is thereby achieved. Fixing in this case is understood to mean that the plug connection is secured against, for example, tensile forces that act contrary to the plug-in direction and result in the plug connection becoming undone. Furthermore, the plug connector element is prevented from "falling out" of the mating connector element. The fixing is preferably irreversible, i.e. following fixing, the plug connection can no longer be undone (non-destructively). Alternatively, the fixing is reversible.

Expediently, the test opening is arranged behind the latching lug, as viewed in the plug-in direction, on the plug connector element. This achieves the effect that, when the plug connector element has been positioned in the test position, the latching recess is positioned "over" the test opening. Over the test opening in this case is understood to mean that, in the test position, the mating connector element surrounds the plug connector element in such a manner that the latching recess of the mating connector element slides over the test opening of the plug connector element, and thus renders this test opening accessible. This additionally achieves the effect that the test opening is accessible only in the test position.

According to a second design variant, the plug connection element, in which the test opening is arranged, has a cable gland having a leadthrough. In an assembled state, a cable is passed into the interior space through the leadthrough. According to the second design, the test opening is realized in the cable gland. The advantage of this design variant is that—unlike the first design variant—both plug connection elements can be already in the final assembled position before or at the time of the tightness test. In other words, the test opening is accessible for tightness testing of the interior space despite the plug connection elements having been plugged into one another. The (total) interior space (to be tested) in this case is constituted by a respective interior space of the cable gland and the part of the (total) interior space in which the cables are electrically connected.

Preferably, in addition, according to the second design variant, the sealing element is arranged between the cable gland and the cable. In addition, for the purpose of realizing the final assembled position, the sealing element is moved—as viewed in the plug-in direction—beyond the test opening. This enables the interior space to be sealed in a reliable manner, since the sealing element, in the final assembled position, is physically arranged between the interior space and the test opening.

The plug connector element additionally has a holding element, preferably realized as a holding cap, which is pushed—in the plug-in direction—onto the cable gland. As it is being pushed on, the holding element also automatically moves the sealing element along with it. For this purpose, the holding element is preferably realized in the manner of a "double sleeve". This means that the holding element has an inner sleeve, and an outer sleeve that concentrically surrounds the inner sleeve, forming a gap. The two sleeves are connected to each other at an end face of the holding element, specifically at an end face that—as viewed in the plug-in direction—faces away from the cable gland. The inner sleeve serves as a type of stop for moving the sealing element. When the holding element is in a pushed-on state on the cable gland, the inner sleeve and the outer sleeve surround a wall of the cable gland. In other words, when being pushed on, out of the test position into the final assembled position, the wall of the cable gland moves into the gap realized between the inner sleeve and the outer sleeve. In the pushed-on state, i.e. in the final assembled state, the inner sleeve covers the test opening "from the inside".

The test position in this case is understood to mean that the holding element (only pushed onto the cable) in a pre-assembly position, as viewed in the plug-in direction, is located on or in front of the respective cable gland in which the test opening is arranged. The sealing element in this case is pushed into the cable gland only to such an extent that ensures the sealing required for the test, but does not close the test opening.

In the final assembled position, the sealing element bears, specifically in a form-fitting and sealing manner, with its radial outer surface against a radial inner surface of the respective gland. On a radial inner surface of the sealing element, the latter bears in a form-fitting and sealing manner against an outer sheath of the respective cable.

Preferably, both the cable gland and the holding element are of the same shape, for example a round shape. The holding element serves to fix and center the cable within the cable gland, and preferably has a latching element, for example a latching lug or a latching recess. In the final assembled position, the cable gland additionally protects the sealing element against external influences such as, for example, spray water. The cable gland has a counter-latching element, for example also either a latching lug or a latching recess, realized to correspond to the latching element of the holding element.

According to a preferred design, the test medium is compressed air. The advantage of compressed air as a test medium is that use is thereby made of a test medium that is convenient, simple and, in particular, electrically compatible in respect of the electric core cables. Electrically compatible in this case is understood to mean that the test medium is preferably not electrically conductive.

The object is additionally achieved according to the invention by a plug connector device. The plug connector device is realized in particular to execute the previously described method. Specifically, the plug connector device is the plug connection already described in the context of the method.

The plug connector device thus has two plug connection elements, namely a plug connector element and a mating connector element. The plug connector element and the mating connector element can be plugged into one another in a plug-in direction. One of the two plug connection elements has a test opening.

When the plug connector device is in a test position, the test opening is accessible, and there is a flow connection between the test opening and an interior space to be tested, such that a test medium, for example compressed air, can be applied to the interior space through the test opening.

In a final assembled position, the flow connection is interrupted.

The test opening is used to check a sealing of the interior space to be tested, which, in the connected state, is realized by the plug connector element and the mating connector element.

Preferably, the plug connector element has a sealing element that—as viewed in the plug-in direction—is arranged before the test opening in the test position and after the test opening in the final assembled position. In the final assembled position, reliable sealing of the interior space to be tested is thus ensured, since the sealing element is physically arranged between the interior space and the test opening, and media, for example moisture or fluids, cannot pass into the interior space via the test opening. Instead, such media are "held back" by the sealing element.

Furthermore, the plug connector device, in particular the plug connector element and the mating connector element, are designed for connecting high-voltage cables. A high-voltage line is therefore terminated to at least one of the two elements of the plug connector device. High-voltage cables are understood to mean, in particular, electric supply cables used to supply electric power to high-voltage components, specifically an electric travel drive in the automotive sector. High voltage in this case is understood to mean typically some hundred volts, e.g. 300-600 V.

The advantages and preferred designs stated in respect of the method are analogously applicable to the plug connector device, and vice versa.

Other features which are considered as characteristic for the invention are set forth in the appended claims.

Although the invention is illustrated and described herein as embodied in a method for checking a sealing of a plug connection, and a plug connection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, parts that are alike in their action are represented with the same references.

Figure 1:
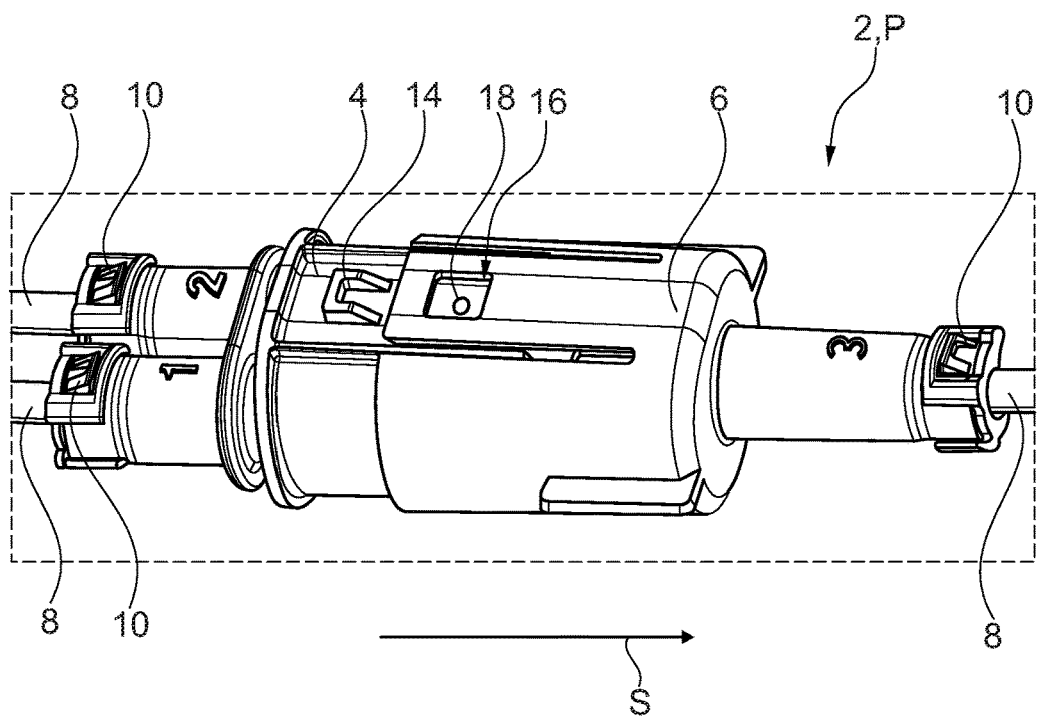
FIG. 1 is a perspective view of a plug connection according to a first design variant, in a test position.

Referring now to the figures of the drawings in detail and first, particularly to FIG. 1 thereof, there is shown a plug connection 2 composed of two plug connection elements, namely a plug connector element 4 and a mating connector element 6, according to a first design variant. The plug connection 2 serves to effect a reversible electrical connection of electric cables 8, in the exemplary embodiment a connection of high-voltage cables for the automotive sector.

In the exemplary embodiment, the plug connection 2 is realized in the manner of an in particular y-shaped (power) distributor, having one incoming cable 8 and two outgoing cables 8.

Figure 2:
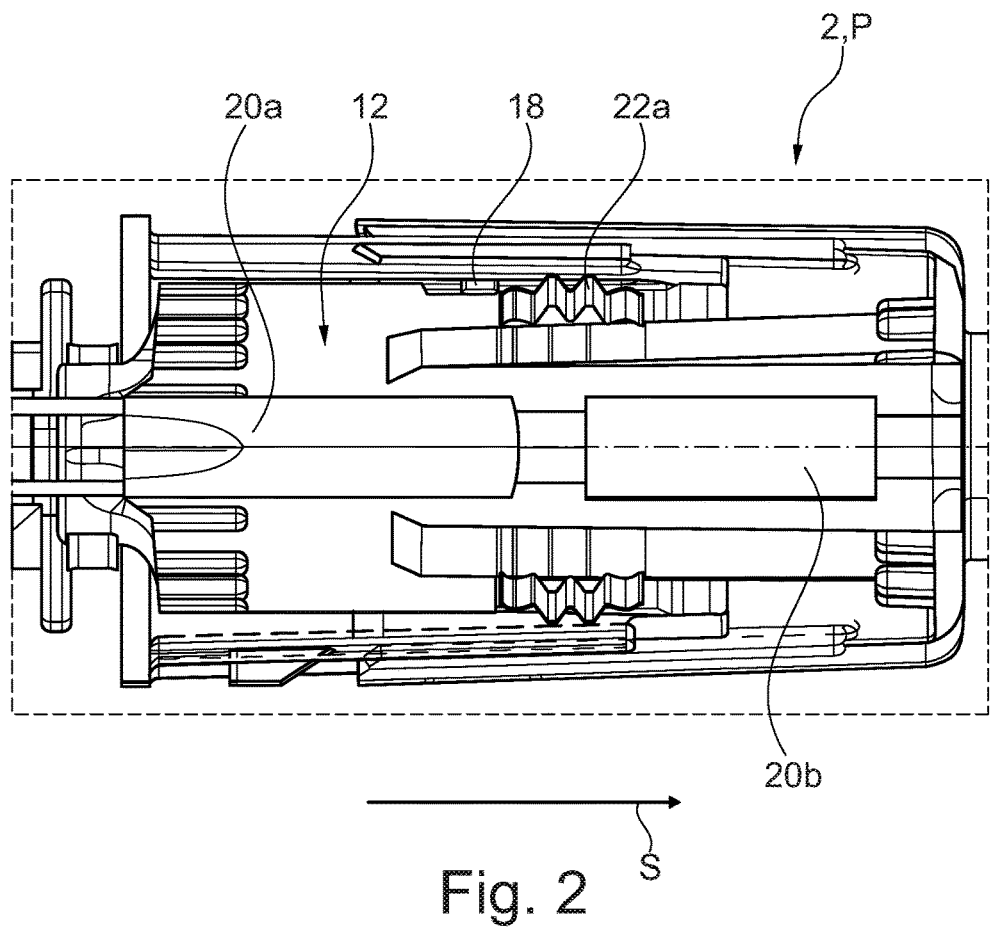
FIG. 2 is a longitudinal sectional representation of the plug connection according to the first design variant, in a test position.

The cables 8 are passed, by leadthroughs 10, into an interior space 12 (see FIG. 2). The leadthroughs 10 are sealed toward the interior space 12, such that longitudinal water-tightness is realized. The interior space 12 is constituted by a part of the plug connector element 4 and a part of the mating connector element 6. Both the plug connector element 4 and the mating connector element 6 each have plug connector housings that, in the connected state, are plugged into one another. The plug connector housings are composed, for example, of an electrically insulating plastic, or alternatively also of a conductive material, in particular metal. For the purpose of realizing the plug connection, the plug connector element 4 can be plugged into the mating connector element 6 in a plug-in direction S. The mating connector element 6 in this case surrounds the plug connector element 4 in a form-fitting manner.

For the purpose of realizing the preferably reversible connection of the plug connection 2, in the exemplary embodiment the connector element 4 additionally has a latching lug 14, which latches with a latching recess 16 made in the mating connector element 6.

For the purpose of checking reliability of sealing of the interior space 12, the plug connector element 4 has a test opening 18. In the exemplary embodiment, the arrangement of the test opening 18 is selected in such a manner that only in a test position P does the test opening 18 render the interior space 12 accessible for a checking operation. For this purpose, the test opening 18 is arranged behind the latching lug 14, as viewed in the plug-in direction S. A test position P in this case is understood to mean a position of the plug connection 2 in which the plug connector element 4 has not been fully inserted into the mating connector element 6. For example, in the exemplary embodiment, in the test position P the plug connector element 4 has been half inserted into the mating connector element 6.

The latching recess 16 in this case is arranged over the test opening 18, such that the latter is accessible.

For the purpose of testing the sealing of the interior space 12, a test medium is applied to the latter. The test medium is preferably compressed air. The test medium in this case is passed into the interior space through the test opening 18. In the case of a possible leakage location, test medium emerges from the interior space 12, enabling possible leakage locations to be detected with ease.

FIG. 2 shows a longitudinal sectional representation of the plug connection 2 having, positioned in the test position P, the plug connector element 4 and the mating connector element 6.

In addition, in the exemplary embodiment the plug connector element 4 has a plug connector contact 20a, and the mating connector element 6 has a mating connector contact 20b. The plug connector contact 20a and the mating connector contact 20b serve to electrically connect the cables 8. Both the plug connector contact 20a and the mating connector contact 20b are arranged in the interior space 12 of the plug connection 2.

In addition, the plug connection 2 has a sealing element 22a, which in the exemplary embodiment is realized as a ring seal and thus surrounds the circumference of the interior space. The sealing element 22a provides additional sealing of the interior space 12. As viewed in the plug-in direction S, the sealing element 22a seals the interior space 12 behind the test opening 18, such that the test medium does not escape there during the testing operation. The interior space 12 is thus sealed both by the seals of the leadthroughs 10 and by the sealing element 22a, such that, for example, no moisture enters the interior space 12.

In the test position P, the test opening 18—as viewed in the plug-in direction—is thus positioned in front of the sealing element 22a, and thereby enables access to the interior space 12 for the test medium.

Figure 3:
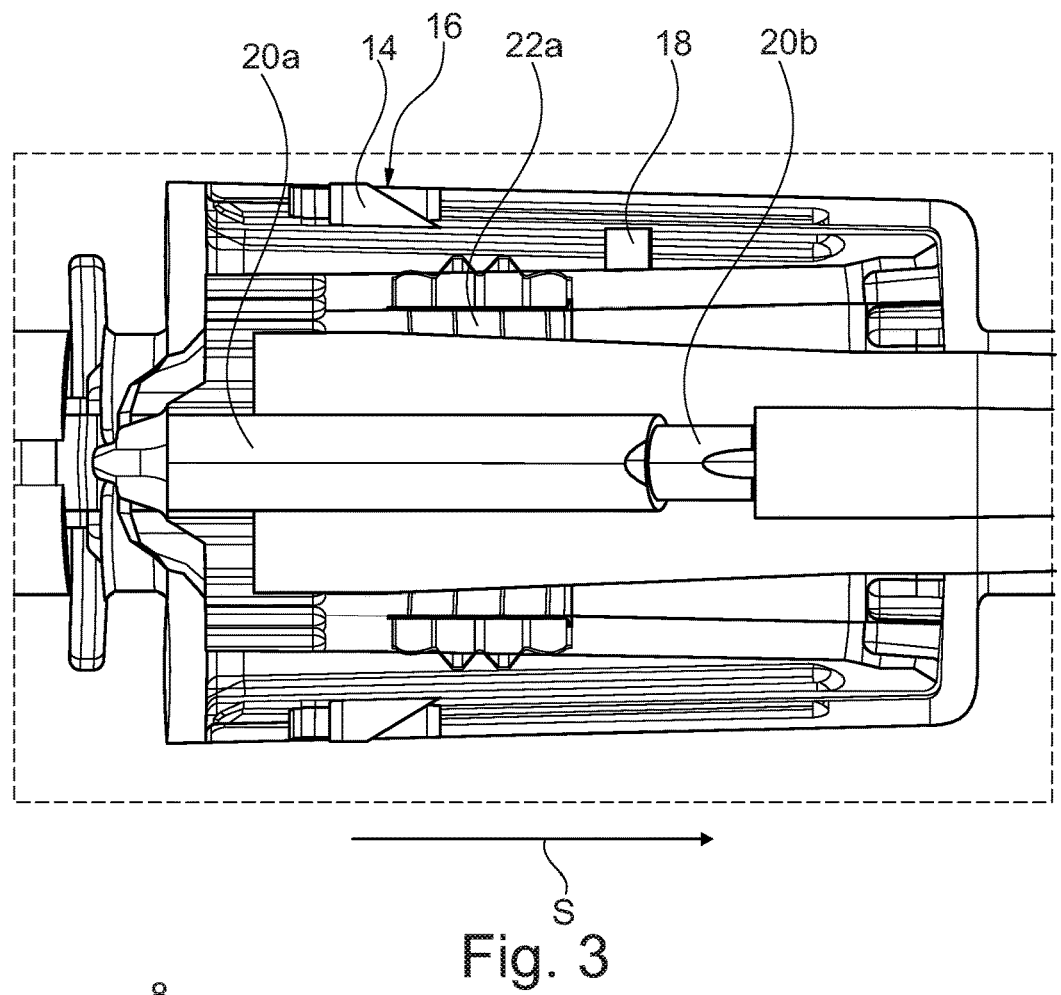
FIG. 3 is a longitudinal sectional representation of the plug connection according to the first design variant, in an end position.

FIG. 3 shows a longitudinal sectional representation of the plug connection 2 in an end position E. End position E in this case is understood to mean a position of the plug connection in which the plug connector element 4 has been fully inserted in the mating connector element 6. The plug connection is thereby fully realized. In order to prevent the plug connection 2 from becoming undone accidentally, in the end position E the latching lug 14 is latched in the latching recess 16.

In the end position E, the test opening 18—as viewed in the plug-in direction S—is arranged behind the sealing element 22a. Ingress of moisture into the interior space 12 is thereby prevented by the test opening 18, in the end position E. This means that the sealing element 22a is arranged in an intermediate region between the interior space 12 and the test opening 18, and thus seals the interior space 12 in relation to the test opening 18, for example in respect of unwanted ingress of moisture through the test opening 18.

In other words: upon assembly of the plug connection 2 (upon bringing the plug connector element 4, in the plug-in direction S, from the test position P into the end position E following checking of the sealing of the interior space 12), the test opening 18 moves beyond the sealing element 22a until—in the end position E—the test opening 18 is located behind the sealing element 22a within the plug connection 2. As a result of the two plug connector elements simply being moved, therefore, the flow connection between the test opening 18 and the interior space 12 is removed, and reliably sealed by the sealing element 22.

As an alternative to this preferred design, other measures for sealing the test opening may also be provided, for example embedding or other closure, e.g. by means of a sealing plug.

Figure 4:
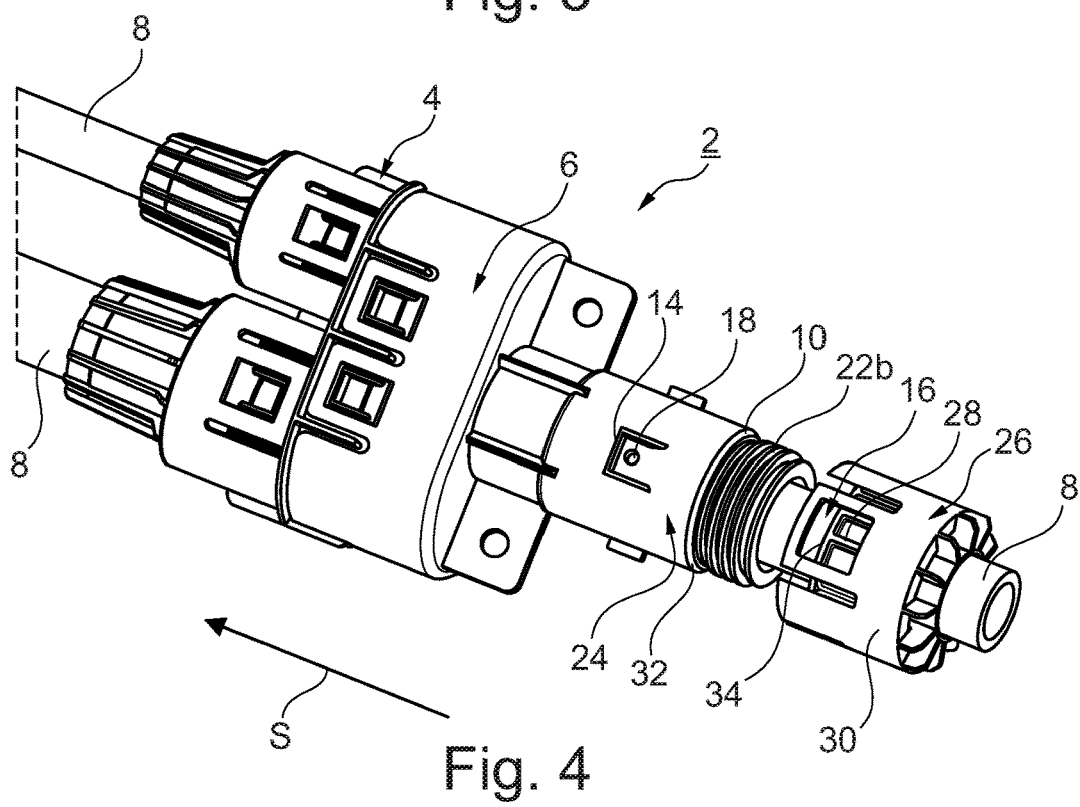
FIG. 4 is a perspective view of a plug connection according to a second design variant.

A second design variant of the plug connection 2 is shown in FIG. 4. The plug connection 2 in this case is likewise realized as a high-voltage distributor.

The plug connection 2 has two plug connection elements, namely the plug connector element 4 and the mating connector element 6.

In the exemplary embodiment the mating connector element 6 has a cable gland 24. The cable gland 24 serves to terminate the cable 8 to the mating connector element 6. For this purpose, the mating connector element 6, and in particular the cable gland 24, has the leadthrough 10, into which the cable 8 is inserted and guided into the interior space 12.

Additionally realized in the cable gland 24 is the test opening 18, via which the tightness of the interior space 12 can be tested. The test opening 18 thus provides access to the interior space 12. In this case, an interior of the cable gland 24 is part of the interior space 12.

In order to fix the cable 8 within the mating connector element 6, and specifically within the leadthrough 10 of the cable gland 24, a holding element 26 is additionally provided, which is pushed onto the cable 8, for example during assembling of the latter. The holding element 26 is realized in the manner of a sleeve, in particular in the manner of a "double sleeve". This means that the holding element 26 has an inner sleeve 28 and, concentrically surrounding the latter, forming a gap, an outer sleeve 30. In addition, there is a latching element, in the exemplary embodiment a latching recess 16, arranged on the outer sleeve 30. As viewed in the plug-in direction S, there is a further sealing element 22b arranged between the holding element 26 and the cable gland 24, in particular pushed onto the cable 8. The further sealing element 22b in this case is realized as a ring seal. It differs from the sealing element 22a according to the first design variant.

Basically, in both realization variants, the plug connection 2 in each case preferably has a (first) sealing element 22a between the housing parts of the plug connector element 4 and of the mating connector element 6, and a plurality of further (second) sealing elements 22b between a respective cable 8 and a respective cable gland 24. According to the second design variant, having four cable glands 24, four sealing elements 22 are thus provided, namely, in each of the individual cable glands, a sealing element 22b and a sealing element 22a that seals the plug connection 2 between the plug connection elements (see FIGS. 2 and 3).

A test position P is provided for performing a test of the tightness of the interior space. In this test position P, the sealing element 22b and the holding element 26 are not completely arranged on the cable gland 24. Access is thereby provided, through the test opening 18, to the interior space 12, thus enabling a test medium to be applied to the latter, and on the other hand, for the test, the interior space 12 is sealed by the sealing element 22b that is not completely arranged on the cable gland 24.

Following a tightness test—for the purpose of realizing a final assembled position E—the holding element 26 is pushed further, in the plug-in direction S, onto the cable gland 24, such that in the final assembled position a wall 32 of the cable gland 24 is arranged between an inner sleeve 28 and the outer sleeve 30 of the holding element 26. In order to secure against pulling-out, in particular contrary to the plug-in direction S, the cable gland 24 has a latching element, in the exemplary embodiment a latching lug 14 realized to correspond to the latching recess 16 of the holding element 26. In the final assembled position E, the two latching elements 14, 16 are latched together, and thus secure the holding element 26, and thereby also the cable 8, against longitudinal displacement, in particular contrary to the plug-in direction S.

As the holding element 26 is moved in the plug-in direction S, the holding element 26 moves, or specifically an end face 34 of the inner sleeve 28 moves the sealing element 22b, likewise in the plug-in direction S, into the cable gland 24. The sealing element 22b is dimensioned such that it realizes a reliable sealing between the cable gland 24 and the cable. Depending on the material and elasticity of the sealing element 22, the outer diameter of the sealing element 22b corresponds at least to the inner diameter of the cable gland 24.

In the final assembled position E, the sealing element 22b, as viewed in the plug-in direction S, has been moved beyond the test opening 18. In other words, the sealing element 22b, as viewed in the plug-in direction S, is arranged between the interior space 12 and the test opening 18, and thus seals the interior space 12 in a reliable manner. Sealing of the interior space 12, and thus of a safety-relevant part of the plug connection 2, is thereby achieved despite a test opening 18 that—from the outside—cannot be closed. Owing to the arrangement of the sealing element 22b in the cable gland 24, it is possible to dispense with closure of the test opening 18.

The following is a summary list of reference numerals and the corresponding structure used in the above description of the invention:

2 plug connection
4 plug connector element
6 mating connector element
8 electric cable
10 leadthrough
12 interior space
14 latching lug
16 latching recess
18 test opening
20a plug connector contact of the plug connector element
20b plug connector contact of the mating connector element
22a,b sealing element
24 cable gland
26 holding element
28 inner sleeve
30 outer sleeve
32 wall
34 end face
E final assembled position
P test position
S plug-in direction

The invention claimed is:

1. A method for checking a sealing of an interior space of a plug connection to be tested, the plug connection having two plug connection elements, namely a plug connector element and a mating connector element, which are plugged into one another in a plug-in direction, one of the plug connection elements having a test opening formed therein to the interior space, which comprises the steps of:
providing a sealing element which, as viewed in the plug-in direction, is disposed before the test opening in a test position;
while in the test position, performing a seal check by applying a test medium through the test opening to the interior space;
moving the sealing element, in the plug-in direction, from being disposed before the test opening in the test position, to being disposed beyond the test opening in a sealing position of the sealing element occurring during a final assembled position in which the sealing element closes a previously existing flow connection between the test opening and the interior space;
wherein in the test position, the sealing element seals the interior space—seen in the plug-in direction—behind the test opening and in the final assembled position, the sealing element seals the interior space in relation to the test opening.

2. The method according to claim 1, wherein during an assembling of the plug connection, the sealing element is moved in the plug-in direction automatically together with a component part selected from the group consisting of the plug connector element and the mating connector element.

3. The method according to claim 1, wherein the plug connector element has the test opening and, for checking the interior space, is plugged into a test position, into the mating connector element, and then, for sealing of the test opening, is brought into the final assembled position.

4. The method according to claim 1, which further comprises disposing the sealing element between the plug connector element and the mating connector element, such that the interior space is sealed by the sealing element.

5. The method according to claim 1, which further comprises surrounding the plug connector element by the mating connector element, and the sealing element is realized as a ring seal.

6. The method according to claim 1, wherein the plug connector element has a latching lug and the mating connector element has a latching recess formed therein, such that, in a final assembled position, the latching lug latches into the latching recess.

7. The method according to claim 6, which further comprises disposing the test opening behind the latching lug, as viewed in the plug-in direction, such that, in a test position, the latching recess is disposed over the test opening.

8. The method according to claim 1, wherein the plug connection element having the test opening has a cable gland with a leadthrough formed therein, through said leadthrough, in an assembled state, a cable is passed into the interior space, and wherein the test opening is realized in the cable gland.

9. The method according to claim 8, which further comprises disposing the sealing element between the cable gland and the cable, and the sealing element is moved beyond the test opening.

10. The method according to claim 8, wherein the plug connection has a holding element, which is pushed onto the cable gland, wherein, as the holding element is being pushed on, the sealing element is automatically moved along with the holding element.

11. The method according to claim 1, which further comprises using compressed air as the test medium.

12. A plug connector device, comprising:
two plug connection elements including a plug connector element and a mating connector element, which can be plugged into one another in a plug-in direction, wherein one of said plug connection elements has a test opening formed therein, wherein in a test position, said test opening is accessible and there is a flow connection between the test opening and an interior space of the plug connector device enabling an applied test medium to flow to said interior space through said test opening, and wherein, in a final assembled position, the flow connection is closed; and
a moveable sealing element which, as viewed in the plug-in direction, is disposed before said test opening in the test position and is disposed after said test opening in the final assembled position;
wherein in the test position, the sealing element seals the interior space—seen in the plug-in direction—behind the test opening, and in the final assembled position, the sealing element seals the interior space in relation to the test opening.

13. The plug connector device according to claim 12, wherein said plug connector element and said mating connector element are configured to connect to high-voltage cables.

* * * * *